United States Patent [19]

Kaczeus

[11] 4,065,799
[45] Dec. 27, 1977

[54] MEANS AND METHOD FOR CLAMPING A DISK PACK

[75] Inventor: Steven L. Kaczeus, Boulder, Colo.

[73] Assignee: Storage Technology Corporation, Louisville, Colo.

[21] Appl. No.: 654,196

[22] Filed: Feb. 2, 1976

[51] Int. Cl.² .............................................. G11B 25/04
[52] U.S. Cl. ...................................... 360/135; 360/98; 360/133
[58] Field of Search ...................... 360/98, 99, 97, 105, 360/135, 133; 346/137; 403/259, 261, 368

[56] References Cited

U.S. PATENT DOCUMENTS

| | | | |
|---|---|---|---|
| 3,587,073 | 6/1971 | Ghose | 360/135 |
| 3,643,240 | 2/1972 | Raiser | 360/98 |

*Primary Examiner*—Bernard Konick
*Assistant Examiner*—Donald McElheny
*Attorney, Agent, or Firm*—Woodcock, Washburn, Kurtz & Mackiewicz

[57] ABSTRACT

An improved clamping system for imposing axial pressure upon a stack of magnetic disks of the type used for retaining digitally coded information. A clamping ring at either end of a stack of disks is provided with an angled face. A bracket or other member which is used to transmit compressive force to the stack is provided with a peripheral land which bears upon the angled face such that force is transmitted to the disk pack across an interface disposed at an angle to the axis of the stack.

21 Claims, 6 Drawing Figures

MEANS AND METHOD FOR CLAMPING A DISK PACK

BACKGROUND OF THE INVENTION

The present invention relates to magnetic disk subsystems and more particularly to means for compressively securing a stack of axially aligned magnetic disks, while assuring that the endmost ones of the disks remain flat and normal to the axis of the pack.

In digital information systems, it is necessary that a vast number of digital bits be stored for subsequent use by data processing circuitry. Although different approaches, such as optical, electrostatic, and electronic, have been used with varying degrees of success as memory units the vast majority of present-day information systems make use of magnetizable elements for storing the digital information. Arrays of magnetizable cores wired in matrices have been widely used, although with the increasing amount of data to be stored and retrieved it has been found desirable to use a translatable medium such as magnetic drums, tape or disks. While tape has found considerable favor, it is necessary to dispose most information on tape in serial fashion. Thus, although a given length of tape may be provided with several parallel tracks, for any given track it is necessary to reel or unreel a length of tape to arrive at a position where a predetermined item of information is stored.

For these and other reasons it has been found advantageous to store digital information upon groups of magnetic disks. In the present context, the term "magnetic disk" is used to denote a circular, planar element having a magnetizable surface. By stacking numbers of disks together in axially spaced relationship, upon a rotatable spindle, it is possible to access numbers of disks at the same time; or, to switch electronically from a transducer adjacent one disk to a similar, parallel transducer which is in contact with a different disk. Thus, a numer of different "addresses" may be accessed in parallel fashion, without the need for traversing many intermediate locations.

An advanced approach to the foregoing method of providing data is disclosed in U.S. Pat. Nos. 3,864,750 and 3,864,747 in which multiple stacks of magnetic disks are driven in synchronism by a common drive means, and accessed by means of an access mechanism having a plurality of magnetic heads, one for each disk surface.

Obviously, economy demands that as many disks as possible be placed in a single stack to avoid the unnecessary duplication of drive and access means. Further, with the introduction of larger disk packs which are non-removable, the number of disk surfaces per stack has been substantially increased. Accordingly, it will be seen that it is desirable to be able to stack as many disks as possible upon a given spindle for simultaneous access by a set of magnetic heads.

Aside from the mechanical constraints which limit the size and weight of a given disk pack, an additional problem arises with the increasing density of data bits per unit area which are written upon the disks. As the bit density increases, the dimensional accuracy of the disk surfaces and transducer heads has become even more important. Also, the accurate tracking of the heads over the disk surfaces has become critical to the operation of the system.

It has been found that the previously-used methods for clamping disks in an axial stack are inadequate to satisfy the increased dimensional requirements. In particular, it has been found that the endmost ones of the disks, which bear the brunt of the initial clamping forces, tend to dish outwardly from the stack. Although this phenomenon has been noted, to date its solution has eluded those skilled in the art. In fact, in many commercial units presently being offered for sale the endmost ones of the disks are considered sacrificial, and are not used for storing digital information due to he above-described distortion.

Accordingly, it will be appreciated that it would be advantageous to provide a means and method for transmitting clamping forces to a stack of magnetic memory disks which allow the endmost ones of the disks to remain substantially parallel, enabling them to be used for storing data.

it is therefore an object of the present invention to provide improved means for applying clamping forces to a stack of magnetic disks.

It is another object of the invention to provide an improved method for clamping a plurality of magnetic disks together to form an axially-aligned stack.

Another object of the invention is to provide clamping means for applying pressure to an axially-aligned group of magnetic disks which does not effect a significant dishing of the endmost ones of the disks.

SUMMARY OF THE INVENTION

Briefly stated, in accordance with one aspect of the invention the foregoing objects are achieved by providing a stack of planar, apertured disks disposed in axial alignment with one another. At one or both ends of the stack is disposed an annular clamping ring, having an inner face disposed against an end one of the disks, and an outer face inclined at some angle with respect to the lower face. A clamping hub is disposed over the clamping ring, the clamping hub including a peripheral land mating against the outer, inclined face of the clamping ring. Tensioning means are provided for drawing the clamping hub against the stack of disks to effect axial compression of the stack.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
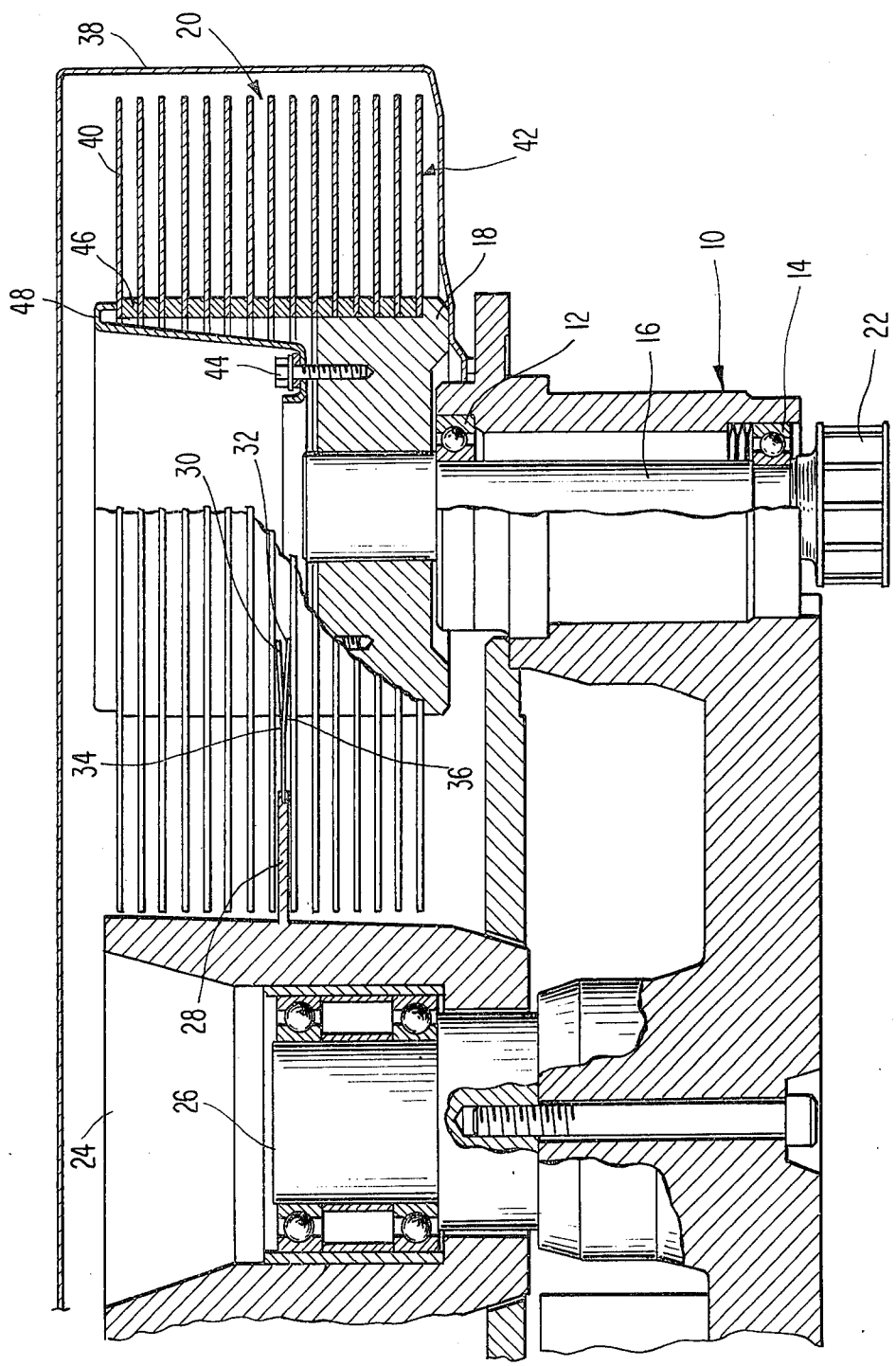
FIG. 1 illustrates a disk pack and a drive assembly as used in the prior art.

Referring to FIG. 1, there is shown a magnetic disk system including a base 10. Journaled within base 10 by means of appropriate bearings 12, 14 is a rotatable spindle 16. A flange 18 is coupled to the upper end of spindle 16, and supports thereon a stack of magnetic disks 20. At the lower end of the spindle a notched pulley 22 is driven through a toothed timing belt (not shown) by an appropriate drive means such as an electric motor (also not shown). As set forth in the above-mentioned U.S. Pat. No. 3,864,747 a plurality of associated spindles and disk packs may be associated with base 10, and driven through a common timing belt by notched pulleys such as that shown at 22.

Centrally disposed upon base 10 is an access mechanism 24, also rotatably journaled upon a spindle 26. The access mechanism includes a plurality of arms which extend between various ones of the disks of stack 20. For simplicity in illustration only a single arm, herein designated 28, is shown. At the end of arm 28 a pair of heads 30, 32 are supported by elongate, resilient fingers 34, 36 respectively. Appropriate means (not shown) are provided for electrically coupling heads 30, 32 to processing circuitry so that digital information may be written upon, or read from, the surfaces of the disks which confront the various heads. In use the disks rotate at an extremely high speed so that a very thin boundary layer of air arises between the heads and the disk surfaces and acts as a hydrodynamic bearing to prevent the heads from abrading or galling the surfaces of the disks. The disks are housed within a casing 38 which seals out dirt and contaminants and minimizes air turbulance.

Although the read/write heads of the access mechanism enjoy some flexibility due to their support upon resilient fingers, they are incapable of properly following or tracking surfaces of disks which are warped or dished. Accordingly, it will be understood that it is extremely critical to have all disks in true axial alignment, and disposed parallel with one another so that the read/write heads may interact with the disk surfaces as they rotate at high speed, while accurately reading or writing data bits upon the surface of the disk.

While the apparatus shown in FIG. 1 in many ways constituted a substantial advance over the prior art it has been found that the endmost ones of the disks of pack 20 tend to dish outward. By this is meant that the upper and lower disks 40, 42 exhibit an outward concavity when tension is applied to the stack by appropriate tensioning means such as bolt 44.

As shown in the Figure, each of the disks are spaced one from the other by means of appropriate spacer rings 46. The spacer rings may advantageously be annular with planar, parallel ends for insuring that the adjacent disks will be parallel to one another and perpendicular to the axis of rotation. Similarly, the land of flange 18 upon which the lowermost disk 42 is received is flat, lying in a plane transverse to the axis of rotation of the pack. A clamping hub 48 is provided for transmitting tensioning force from bolt 44 to the upper end of the disk pack, herein the upper surface of upper disk 40. Due to its configuration, hub 48 may be formed from relatively thin material, such that its area of contact upon the upper surface of disk 40 is relatively small.

In practice it has been found that despite the planar nature of the land supporting lower disk 42, and the relatively small contact area between upper disk 40 and clamping hub 48 the endmost disks, 40, 42 are caused to dish outwardly as tension is applied to the stack. This phenomenon is especially noticeable with relatively long stacks of disks. The read/write heads to not accurately follow the configuration of the distorted disks, and accordingly the integrity of the latter as sites of information storage is relatively poor.

Figure 2:
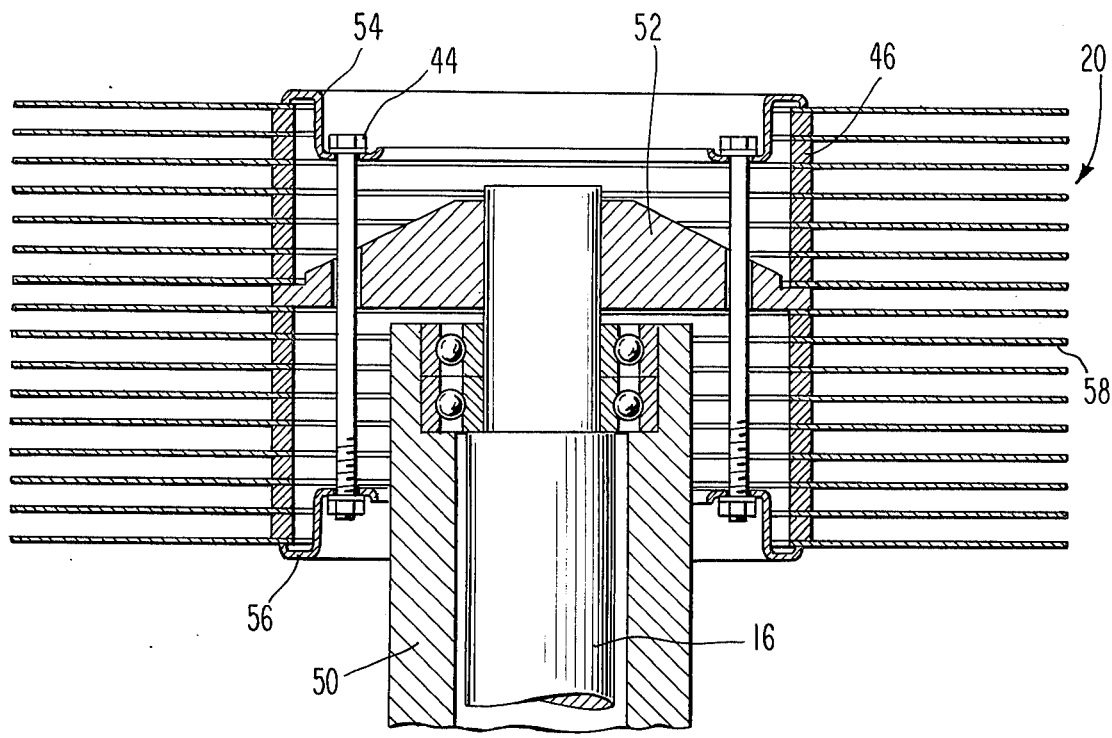
FIG. 2 illustrates another disk assembly and clamping arrangement according to the prior art.

Turning now to FIG. 2, there is shown another prior art structure used for rotatably supporting a stack of magnetic disks, and wherein like numerals are utilized to designate elements corresponding to those of FIG. 1. A spindle 16 is rotatably journaled within a support 50, and a flange 52 is affixed to the upper most end of the spindle for supporting a stack of disks 20. It will be noted that the periphery of flange 52 is disposed intermediate the ends of the disk stack, and clamping means including upper and lower clamping hubs 54, 56, respectively are disposed at opposite ends of the stack for clamping the disks together.

Conventionally one of the disks, which may, for instance, be disk 58 is provided with a permanent set of magnetic indicia termed "servo tracks". These tracks are sensed by appropriate ones of the read/write heads and used to locate the heads upon the appropriate track of the servo disk. As all of the read/write heads are ganged together by means of a common access mechanism, properly locating one head with respect to disk 58 automatically achieves the correct location of all other heads. Where multiple disk packs are provided about a common access mechanism a single serve disk will serve to locate the access mechanism with respect to all of the various disk packs.

A plurality of spacer rings 46 are provided for spacing the magnetic disks one from the other in parallel relationship. As was the case with the clamping hub of FIG. 1, clamping hubs 54 and 56 are provided with dropped centers to enhance the rigidity and clamping characteristics thereof. Through bolts 44 comprise tensioning means which extend between the clamping hubs through appropriate apertures in spindle flange 52.

Despite the fact the end ones of the disks shown in FIG. 2 are supported upon the flat axial end surfaces of the underlying spacer rings, it has been found that as the tension supplied by bolts 44 increases the endmost ones of the disks are distorted into a convex configuration wherein they draw away fron one another, axially outwardly of the disk pack. While the distortion which occurs is relatively small and imperceptible to the human eye, it is sufficient to provide a serious impediment to the accurate deposition and retrieval of magnetic information upon these disks. The information deposition and retrieval is even more crucial, and more easily disturbed, in the case of modern machines wherein the density of data bits per unit area of disks is substantially increased. Still further, as the axial length of the disk pack 20 is increased higher clamping forces are required. This in turn further accentuates the distortion of the endmost ones of the disks.

Figure 3A:
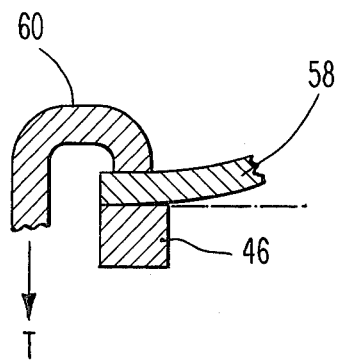
FIGS. 3a and 3b are diagrammatic representations of prior art clamping arrangements.

Turning now to FIG. 3a, there is shown an enlarged view of the uppermost disk 58 in a disk pack. The disk rests upon a spacer ring 46 having flat, parallel upper and lower surfaces. A clamping hub 60, of the general type shown in FIGS. 1 and 2, is brought into engagement with the upper surface of disk 58 and a tensioning force T applied through appropriate tensioning means. Force T is then transmitted through hub 60 to the upper surface of disk 58. In response to this force the disk curves upwardly, as shown in greatly exaggerated form in the Figure.

While the forces involved are not fully understood, it is believed that tensioning force T effects a distortion of the clamping hub 60 which in turn causes a shift in the forces applied to the upper surface of disk 58. Localized areas of the disk near the point of contact with the clamping hub are then subjected to internal stresses which cause the disk to curve upwardly, despite the fact that it is firmly disposed upon a flat, planar surface of spacer ring 46. The provision of an extended flat surface upon the lower, abutting end of hub 60 does not serve to alleviate the problem.

Figure 3B:
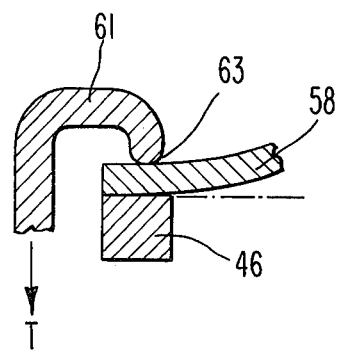

FIG. 3b shows another prior art approach wherein a clamping hub 61 has a downwardly depending lip provided with a radiused surface 63 for contacting disk 58. In theory, when tensioning force T is applied to the clamping hub the radiused surface should allow the clamp to "roll" on the upper surface of disk 58, preventing the generation of unequal forces within the disk and achieving an essentially point contact which urges the disk against the planar upper surface of spacer ring 46. Such an approach, however, has not been successful and continued dishing of the clamped disk has been observed.

Figure 4:
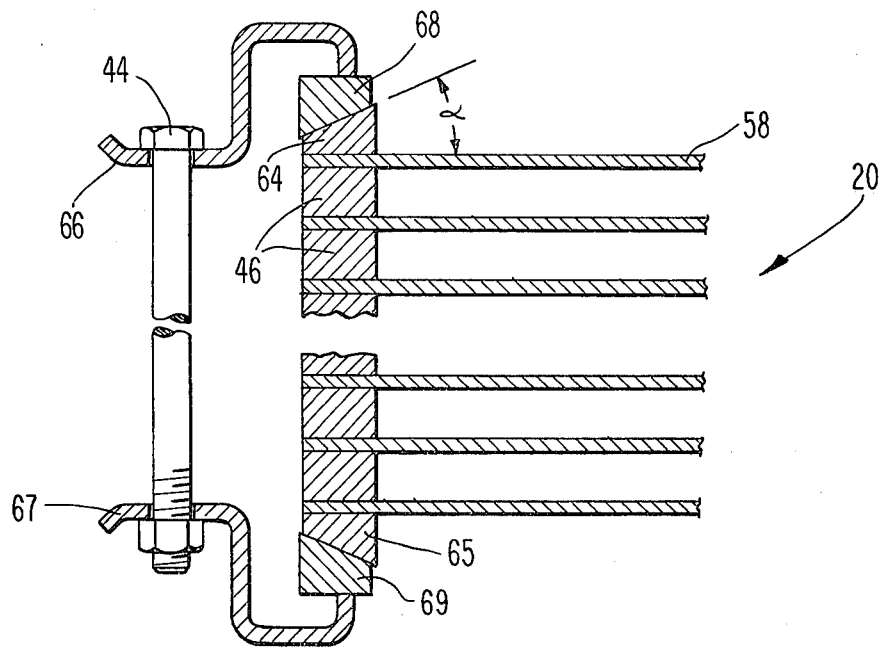
FIG. 4 illustrates a clamping system according to the present invention.

Turning now to FIG. 4, there is shown one embodiment of the present invention in which a stack of disks 20, separated by appropriate spacer rings 46, receives compressive force through a first annular clamping ring 64. In the illustrated embodiment, it is assumed that the disk stack is supported by a spindle flange intermediate the ends thereof, much in the manner of FIG. 2. Accordingly, separate clamping hubs and clamping rings are provided at both ends of the stack. It should be recognized, however, that the inventive structure may be placed at either the upper or lower end of a disk stack in a given application.

The lower surface of clamping ring 64 is planar, and mates against the uppermost surface of an upper disk 58. The upper surface of the clamping ring, however, is inclined at an angle $\alpha$ to the lower surface thereof, substantially as shown.

Surmounting clamping ring 64 is a second clamping ring 68 having a lower surface which is inclined at substantially the same angle of the upper surface of first ring 64. The uppermost surface of the second clamping ring 68 may advantageously be normal to the axis of the disk pack, that is, parallel to the planes of the various disks. The downwardly-depending periphery of the clamping hub 66 is placed upon the second ring 68 for transmitting tensioning force produced by bolt 44 to the disk stack. At the lower end of the stack is disposed a clamping arrangement which is substantially identical to that at the upper end. The outer boss of clamping hub 67 engages a second ring 69 which in turn confronts a first clamping ring 65 along an angled face. The angle $\alpha$ between the angled face of ring 65 and a plane perpendicular to the axis of the disk stack is determined by the coefficient of friction between the confronting clamping rings.

The angled faces of the second rings 68, 69 need not be flush with the confronting, angled faces of the first rings and it has been found advantageous to provide a slight differential between the angles or to provide a radius upon the confronting faces of the second rings. This assures a concentric area of contact, which is somewhat difficult to achieve through mating areas of finite width.

As the confronting faces of clamping rings 64, 68 and 65, 69 are disposed at an angle to the plane of the disks, the forces transmitted thereby are resolved into two components: a first component coplanar with the angled faces of inner ring 64 and a second component perpendicular to the face. The resultant force is then substantially parallel to the axis of the disk pack. It has been found that by using the present structure the upward dishing of disk 58 is substantially eliminated although an axially-directed, compressive force continues to be applied to the disk pack.

In a preferred embodiment, the angle $\alpha$ is at least as large as that angle whose tangent value is defined by the coefficient of friction $\mu$ between the mating surfaces of clamping rings 64 and 68. This relationship is given by the expression $$\tan \alpha \geq \mu$$

In the embodiment shown in FIG. 4 it is assumed that the disk pack 20 is supported intermediate its ends by a spindle flange of the type shown in FIG. 2 above. Accordingly, symmetrical clamping means including clamping hubs 66, 67 and first and second clamping rings 64, 65 and 68, 69 respectively are provided at opposite ends of the disk pack. It will be seen, however, that should the disk pack be supported at one end thereof by a spindle flange such as that shown in FIG. 1, such a flange may easily replace clamping hub 66, or may be machined at an angle so as to take the place of the lower one of clamping ring 68. Such modifications are obviously within the capability of those skilled in the art, and it is anticipated that such adaptations of the invention may be made in implementing the teachings hereof.

Figure 5:
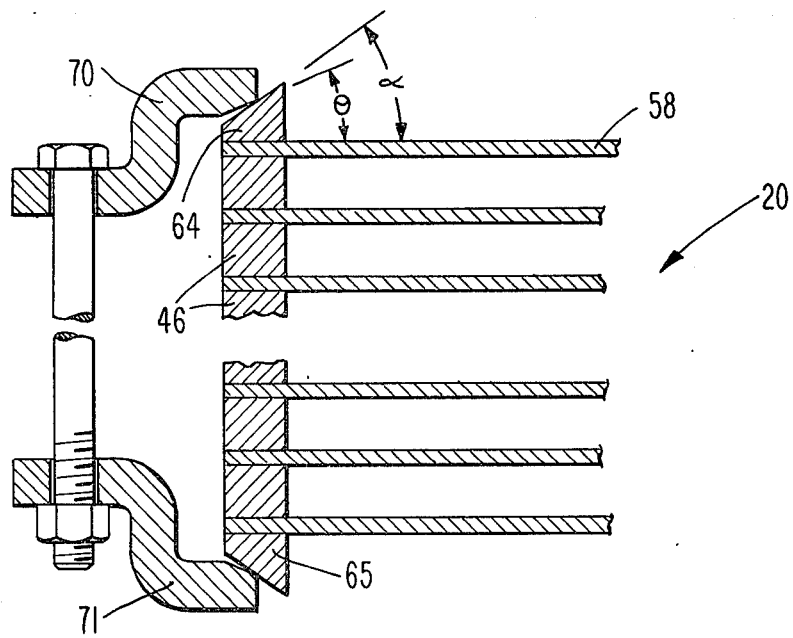
FIG. 5 illustrates another clamping system utilizing principles of the present invention.

FIG. 5 shows another embodiment of the invention wherein a pair of machined clamping hubs 70, 71 are provided with outer bosses having angled faces which bear directly upon the uppermost, angled faces of clamping rings 64, 65 respectively. As was the case with FIG. 4, it is supposed that the disk pack of FIG. 5 is supported intermediate its ends by a spindle flange although it may obviously be supported at one end thereof by such a flange which may be formed so as to replace the lower one of the clamping hubs.

In the embodiment of FIG. 5, the upper faces of the clamping rings are disposed at an angle $\alpha$ with respect to the plane of uppermost disk 58. The angle $\theta$ of the peripheral faces of the clamping hubs is smaller than the angle $\alpha$ in order to provide a line contact at a predictable diameter about the upper face of the clamping rings. The portion of the periphery of the clamping hub which abuts the angled face of the clamping ring is preferably provided with a small radius in order to prevent the hub from digging in to the upper, angled surface of the clamping ring. The optimum angle $\alpha$ for the angled face of the clamping ring continues to be at least the arc tangent equalling the coefficient of friction between the mating surfaces of the clamping hub and adjacent clamping ring.

With prior art clamping arrangements a dishing of 0.015 inches to 0.020 inches has been experienced with magnetic disks 14 inches in diameter. Successfully tested embodiments of the present invention have reduced the measured disk runout to 0.005 inches or less, which dimension may be considered insignificant in view of the fact that this dimension is less than the axial runout allowed for the disk itself. Accordingly, for the present purposes the dishing of the disks due to clamping forces may be considered to have been eliminated.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by letters Patent of the United States is:

1. In a magnetic disk subsystem of the type including a stack of axially aligned magnetic disks, a rotatable spindle for carrying the disks, and an access mechanism having transducers for interacting with the disks, means for clamping the disks in axial alignment comprising:

an annular clamping ring having a lower face disposed upon the uppermost one of the disks and having an upper face inclined with respect to said lower face;

a clamping hub including an outer boss having an inclined surface thereon, said inclined surface abutting said upper face of said clamping ring; and tensioning means for drawing said clamping hub downwardly against said clamping ring and axially compressing the stack of magnetic disks, the interaction of said inclined face and said inclined surface being such that dishing of the uppermost disk is substantially eliminated.

2. Clamping means as defined in claim 1 further including base clamping means disposed at the axial end of the stack of magnetic disks opposite the clamping ring and engaging said tensioning means for axially compressing the stack from opposite ends.

3. Means as defined in claim 2, wherein said base clamping means comprises a second annular clamping ring having an upper face disposed against the lowermost one of the disks and having a lower face inclined with respect to the upper face thereof; and a second clamping hub including an outer boss having an inclined surface thereon, said inclined surface overlying said lower face of said second clamping ring;

said tensioning means engaging said first and said second clamping hubs and tending to draw them toward one another.

4. Means as defined in claim 3, wherein said upper and said lower faces of said first and said second clamping rings are disposed at an angle α with respect to the lower and upper faces thereof, respectively, said angle α being the arc tangent of the coefficient of friction between said clamping rings and the adjacent ones of said clamping hubs.

5. Means as defined in claim 1, wherein said clamping hub comprises an inner hub member and a second clamping ring, said second clamping ring having an upper surface engaging said inner hub member and a lower surface abutting said upper surface of said clamping ring.

6. Means as defined in claim 5 further including base clamping means disposed at the end of the stack of magnetic disks opposite said clamping ring and engaging said tensioning means for axially compressing the stack from opposite ends.

7. Means as defined in claim 6, wherein said base clamping means comprises a lower annular clamping ring having an upper face disposed upon the lowermost one of the disks and having a lower face inclined with respect to the upper face thereof; and a second clamping hub comprising an inner hub member and a second mating ring; said second mating ring having a lower surface engaging said second inner hub and an upper surface abutting said lower surface of said lower clamping ring;

said tensioning means engaging the first and second inner hub members and tending to draw said members toward one another.

8. Means as defined in claim 7, wherein the upper and lower faces of said upper and lower clamping rings are disposed at an angle α with respect to the lower and upper faces thereof, respectively, said angle being the arc tangent of the coefficient of friction between the rings and the adjacent ones of the disks.

9. In a magnetic disk subsystem of the type including a stack of axially aligned magnetic disks having concentric apertures therein, a spindle for rotatably supporting the stack, and an access mechanism having transducers adapted to be electromagnetically coupled to ones of the disks, means for applying axial pressure to the stack, comprising:

a clamping hub having a peripheral surface whose diameter is greater than the diameter of the apertures in the disks, said peripheral surface overlying the uppermost one of the disks;

a clamping ring disposed between said clamping hub and the end one of the disks and having a lower surface substantially parallel with the upper surface of said disk and an upper surface extending at an angle α to the upper surface of said disk; and tensioning means for drawing said clamping hub and clamping ring against said disk to axially compress said stack, the interaction of said angled upper surface of said clamping ring and said peripheral surface of said hub being such that dishing of the endmost disk is substantially eliminated.

10. Means as defined in claim 9, wherein said angle α is substantially equal to the arc tangent of the coefficient of friction between said clamping ring and said disk.

11. Means defined in claim 10, wherein said peripheral surface of said clamping hub is radiused.

12. Means defined in claim 10, wherein said peripheral surface extends at an angle θ to the uppermost one of the disks.

13. Means defined in claim 12, wherein the angle α is larger than the angle θ.

14. Means defined in claim 12, wherein θ and α are substantially equal.

15. Means defined in claim 10 further including a second clamping hub having a peripheral surface whose diameter is greater than the diameter of the apertures in the disks, said peripheral surface overlying the lowermost one of the disks;

a second clamping ring disposed between said hub and the lowermost one of the disks and having an upper surface substantially parallel with the lower surface of said last-named disk and a lower surface extending at an angle α to the lower surface of said last-named disk;

said tensioning means extending between said first and said second clamping hubs and urging said hubs toward one another for axially compressing said stack.

16. Means defined in claim 15, wherein the angle α is substantially equal to the arc tangent of the coefficient of friction between the clamping rings and the adjacent ones of said clamping hubs.

17. Means defined in claim 16, wherein said peripheral surfaces of said clamping hubs are radiused.

18. Means defined in claim 16, wherein said peripheral surfaces extend at an angle θ to the adjacent ones of the disks.

19. Means defined in claim 18, wherein the angle $\theta$ is less than the angle $\alpha$.

20. The method of clamping together in axial alignment a plurality of thin, apertured magnetic disks of the type utilized for storing digital information, comprising:
   providing an annular clamping ring having a first, lower face adapted to engage the uppermost disk of a stack of disks, and having an upper surface inclined at an angle $\alpha$ to the lower surface thereof;
   providing a clamping hub having an outer, peripheral surface for mating against the upper surface of said clamping ring: and
   exerting pressure against said clamping hub for compressing the stack of disks whereby the interaction of said mating surfaces is such that dishing of the uppermost disk is substantially eliminated.

21. The method of clamping together in axial alignment a plurality of axially aligned apertured disks of the type used for storing digital information thereon, comprising the steps of:
   providing an annular clamping ring at either end of the stack, each clamping ring having an inner face abutting on an end one of the disks, and an axially outer face disposed at an angle $\alpha$ to the inner face thereof;
   providing a pair of clamping hubs, each hub having a peripheral surface engaging with the axially outer surfaces of the clamping ring; and
   urging the clamping hubs toward one another for axially compressing the stack of disks whereby the interaction of said peripheral surfaces of said hubs and the adjacent, axially outer surfaces of said clamping rings is such that dishing of the end ones of the disks is substantially eliminated.

* * * * *

UNITED STATES PATENT AND TRADEMARK OFFICE
CERTIFICATE OF CORRECTION

PATENT NO. : 4,065,799

DATED : December 27, 1977

INVENTOR(S) : Steven L. Kaczeus

It is certified that error appears in the above-identified patent and that said Letters Patent are hereby corrected as shown below:

Col. 1, line 39, "numer" should be --number--.

Col. 2, line 16, "it" should be --It--.

Col. 3, line 65, "to" should be --do--.

Col. 4, line 23, "serve" should be --servo--.

Cols. 8 & 9, claims 11,12,13,14,15,16,17,18 and 19, line 1, "Means" should be --Means as-- in keeping with Amendment of April 29, 1977.

Signed and Sealed this

Thirteenth Day of June 1978

[SEAL]

Attest:

RUTH C. MASON
Attesting Officer

DONALD W. BANNER
Commissioner of Patents and Trademarks